United States Patent [19]

Amati

[11] 4,208,345
[45] Jun. 17, 1980

[54] 2-HYDROXY-n-PROPYLAMINE DERIVATIVES USEFUL AS SURFACE ACTIVE AGENTS

[75] Inventor: Werner Amati, Hersberg, Switzerland

[73] Assignee: Sandoz Ltd., Basel, Switzerland

[21] Appl. No.: 881,958

[22] Filed: Feb. 27, 1978

[30] Foreign Application Priority Data

Mar. 1, 1977 [CH] Switzerland ............... 2553/77

[51] Int. Cl.² ............... C07C 143/54; C07C 143/64; C07C 63/50
[52] U.S. Cl. ............... 260/507 R; 8/138; 252/358; 252/351; 562/444; 260/509
[58] Field of Search ............... 260/509, 507 R; 562/444

[56] References Cited

U.S. PATENT DOCUMENTS 2,860,160 11/1958 Sundberg et al. ............... 562/444
3,210,410 10/1965 Gaertner ............... 260/509

FOREIGN PATENT DOCUMENTS 1617077 2/1971 Fed. Rep. of Germany ............ 260/509
1087415 10/1967 United Kingdom ............ 260/501.12

Primary Examiner—Nicky Chan
Attorney, Agent, or Firm—Gerald D. Sharkin; Richard E. Vila; Joseph J. Borovian

[57] ABSTRACT

2-Hydroxy-n-propylamines of formula,

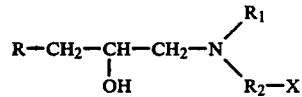

in which R is a mono- or dialkylphenolpoly-($C_{2-3}$)-alkyleneglycolether group bound through an oxygen atom and containing at least 8 ($C_{2-3}$)alkyleneoxy units of which at least 50% are ethyleneoxy, $R_1$ is hydrogen or alkyl, optionally substituted with hydroxyl or X, $R_2$ is alkylene, optionally substituted with hydroxyl, and X is an acid group, the compounds being in free acid or salt form, are useful as surface active agents, especially for use as dispersing or emulsifying agents in textile lubricant and fat liquor emulsions, and as agents for the degreasing of pelts and leathers, as tanning auxiliary agents and for the desizing of textile materials.

13 Claims, No Drawings

2-HYDROXY-n-PROPYLAMINE DERIVATIVES USEFUL AS SURFACE ACTIVE AGENTS

The present invention relates to 2-hydroxy-n-propylamine derivatives, useful as surface active agents.

According to the present invention there are provided compounds of formula I, $$R-CH_2-CH(OH)-CH_2-N(R_1)(R_2-X) \quad I$$

in which

R is a mono- or dialkylphenolpoly-($C_{2-3}$)-alkyleneglycolether group bound through an oxygen atom, $R_1$ is hydrogen, unsubstituted alkyl or alkyl substituted with a hydroxyl group and/or a moiety X, $R_2$ is alkylene, unsubstituted or substituted with a hydroxyl group, and X is an acid group, with the provisos that R contains at least 8 ($C_{2-3}$)alkyleneoxy units and that an average of at least 50% of the alkyleneoxy units in R are ethyleneoxy, in free acid or salt form.

The mono- or dialkylphenoxy group in R is suitably any such group of the type conventionally encountered in surface active agents which feature mono- or dialkylphenolpolyalkyleneglycolether groups. The alkyl substituent of the monoalkylphenoxy group or each alkyl substituent of the dialkylphenoxy group can be straight or branched chain, the latter being preferred. Preferably, the alkyl substituent of the monoalkylphenoxy group or at least one of the alkyl substituents of the dialkylphenoxy group contains at least 3, more preferably, at least 4 carbon atoms. Furthermore, the alkyl substituent of the monoalkylphenoxy group or each alkyl substituent of the dialkylphenoxy group contains a maximum of 9 carbon atoms. Thus, the alkyl substituent of the monoalkylphenoxy group or each alkyl substituent of the dialkylphenoxy group preferably contains 4 to 9 carbon atoms.

When R contains a dialkylphenoxy group, the sum of the carbon atoms in the two alkyl groups is preferably 8 to 18. The alkyl groups are preferably in meta-positions to each other on the benzene nucleus. It is also preferred that the alkyl groups are the same.

When R contains a monoalkylphenoxy group, the single alkyl substituent can be in the ortho-, meta- or para-position relative to the phenoxy oxygen atom, but is preferably in the para-position. Further, such alkyl is preferably of 8 or 9, more preferably 9, carbon atoms.

The alkyleneoxy units in R are preferably, each independently, ethyleneoxy or propyleneoxy($-CH_2CH(CH_3)O-$), of which at least 50% must be ethyleneoxy. Independently of their individual nature, there are preferably 8 to 30, more preferably 8 to 24, even more preferably 8 to 18, still more preferably 8 to 15, and most preferably 10 to 15 alkyleneoxy units in R.

Of the ethyleneoxy and propyleneoxy units, the former are preferred. Thus, increasing preference is given to compounds of formula I having an increasing ratio of ethyleneoxy to propyleneoxy units. Most preferably all the alkyleneoxy units are ethyleneoxy units.

Preferably R is a group of formula(a), $$\text{(a)} \quad R_3-C_6H_3(R_4)-O-(\text{Alkylene}-O)_n-$$

in which $R_3$ is ($C_{4-9}$)alkyl, $R_4$ is hydrogen or ($C_{4-9}$)alkyl, each Alkylene, independently, is $-CH_2CH_2-$ or $-CH_2CH(CH_3)-$ and n is an integer 8 to 18, with the proviso that an average of at least 50% of the alkyleneoxy units, Alkylene-O, are ethyleneoxy.

When $R_4$ is hydrogen, $R_3$ is preferably $C_8-$ or $C_9-$, more preferably $C_9$-alkyl. n is preferably an integer 8 to 15, more preferably 10 to 15. It is preferred that each Alkylene is $-CH_2CH_2-$.

When $R_1$ is an alkyl group, this may be straight or branched chain, and preferably contains 1 to 6 carbon atoms. If it is substituted with a hydroxyl group it is preferably of at least 2 carbon atoms, the hydroxyl group being preferably other than on the α-carbon atom and most preferably being on the β-carbon atom. $R_1$ is preferably hydrogen, ($C_{1-6}$)alkyl, ($C_{2-4}$)hydroxyalkyl, carboxy- or sulfo-substituted ($C_{1-4}$)alkyl or carboxy- or sulphosubstituted 2-hydroxy-n-propyl, each of the carboxyl or sulfo groups optionally being in salt form. More preferably $R_1$ is ($C_{1-4}$)alkyl or ($C_{2-4}$)hydroxyalkyl.

X is suitably any acid group of the type conventionally encountered in amphoteric and anionic surface active agents, and is preferably sulfo or carboxyl, each of which may be in salt form, and more preferably carboxyl, optionally in salt form.

$R_2$ may be straight or branched chain alkylene, optionally substituted with a hydroxyl group. When the alkylene group is substituted, the hydroxyl group is preferably attached other than at the α-position, preferably being at the β-position relative to the nitrogen atom to which $R_2$ is attached. Preferably $R_2$ is ($C_{1-4}$)alkylene or 2-hydroxy-1,3-trimethylene, more preferably being 2-hydroxy-1,3-trimethylene when X attached thereto is a sulfo group, or being methylene when X attached thereto is a carboxyl group.

The most preferred significance of $-R_2-X$ is $-CH_2-COOH$, optionally in salt form.

A preferred group of formula $$-N(R_1)(R_2-X)$$

in the compounds of formula I is the group of formula(b), $$\text{(b)} \quad -N(R_1')(R_2'-X')$$

in which $R_1'$ is hydrogen, ($C_{1-6}$)alkyl, ($C_{2-4}$)hydroxyalkyl or a group of formula $-R_2'-X'$, $R_2'$ is ($C_{1-4}$)alkylene or 2-hydroxy-1,3-trimethylene, and X' is a sulfo or carboxyl group in free acid or salt form.

When the compounds of formula I are in salt form, suitable cations are those generally encountered in salt forms of surface active agents, especially alkali metal cations, e.g. lithium, sodium or potassium, sodium being the most preferred.

A preferred class of compounds of formula I is constituted by the compounds of formula I'

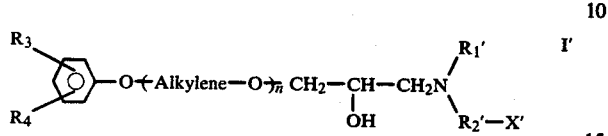

in which $R_3$, $R_4$, $R_1'$, $R_2'$, X', Alkylene and n are as defined above.

In the compounds of formula I', each Alkylene is preferably —CH$_2$CH$_2$—; $R_1'$ is preferably (C$_{1-4}$)alkyl or (C$_{2-4}$)-hydroxyalkyl; —$R_2'$—X' is preferably —CH$_2$CH(OH)CH$_2$SO$_3$M or —CH$_2$COOM, wherein M is hydrogen or equivalent of a cation; and/or n is preferably 10 to 15. —CH$_2$COOM is preferred to —CH$_2$CH(OH)CH$_2$SO$_3$M for —$R_2'$—X'. Where two —$R_2'$—X' groups are present, then such groups are preferably identical.

The present invention also provides a process for the production of a compound of formula I, which comprises
(a) N-alkylating a compound of formula II,

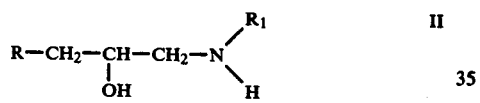

in which R and $R_1$ are as defined above, with an alkylating agent which yields the group of formula —$R_2$—X, as defined above, or
(b) reacting a compound of formula III,

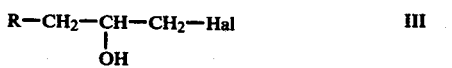

in which
R is as defined above, and
Hal is chlorine or bromine, of which chlorine is preferred,
with a compound of formula IV,

in which
$R_1$, $R_2$ and x are as defined above.

The above process may be carried out in conventional manner. If desired, inter-conversion from free acid to salt form and *vice versa* may be carried out, again suitably in conventional manner.

The resulting compounds of formula I may be isolated or purified in conventional manner, although purification is not necessary, the crude product being suitably for direct use as a surface active agent.

Suitable alkylating agents for use in the process variant (a) include compounds of formula V,

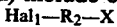  Hal$_1$—$R_2$—X   V in which
$R_2$ and X are as defined above, and
Hal$_1$ is chlorine, bromine or iodine, of which chlorine and bromine are preferred,
α-, β-unsaturated alkenoic acids and salts thereof, especially those of formula VI,

in which
M is as defined above, and one of
$Y_1$ and $Y_2$ is hydrogen and the other is hydrogen or methyl,
or sultones, especially those of formula VII,

in which m is an integer 3 or 4, of which 3 is preferred.
The starting compounds of formulae II, III, IV, V, VI and VII are either known or can be produced by known methods from available starting materials.

As previously indicated, the compounds of the present invention are useful as surface active agents and, accordingly, can be used in all applications where anionic, cationic and/or amphoteric surface active agents are employed, e.g. in the treatment of textiles, paper, pelts and leathers. They may be used as such or in preparation form e.g. in aqueous or aqueous/organic solution or dispersion form, suitable organic solvents in such forms being ethanol, isopropanol, dioxan, methyl or ethyl cellosolve, and sec.- or iso-butanol. Further surface active agents may be present.

The compounds of formula I possess, in particular, dispersing, emulsifying, degreasing and desizing properties. Those compounds of formula I, in which $R_1$ is alkyl substituted with a moiety X, and thus which contain 2 moieties X per molecule, have an anionic character, whereas those in which $R_1$ is hydrogen or alkyl, optionally substituted with a hydroxyl group, have amphoteric character. Thus the compounds of the invention can be suitably selected for application in textile, paper, leather and/or pelt treatment according to the particular properties required in the specific area of application.

The compounds of the present invention are especially useful as dispersing agents and emulsifying agents, more especially for synthetic or natural polar fatty materials. Thus the present invention further provides a method of dispersing or emulsifying a synthetic or natural polar fatty material comprising using, as a dispersing or emulsifying agent, a compound of the formula I, as defined above. Preferably the compounds are employed in this method for dispersing or emulsifying natural polar fatty materials, especially natural fats and oils. Thus the compounds can be used as dispersing or emulsifying agents in the preparation of textile lubricant emulsions and of fat-liquor emulsions for fat-liquoring. Accordingly, the present invention further provides textile lubricant and fat-liquor emulsions characterised in that they contain a compound of formula I, as defined above, as emulsifying agent. Such emulsions contain water and/or an organic solvent conventionally employed in such preparations. Preferably the percent ratio by weight of compound(s) of formula I: synthetic or natural polar fatty material is in the range 5:95 to 90:10, more preferably 8:92 to 50:50, and most preferably 12:88 to 25:75. When, as is generally the case, water is present in such emulsions, the amount thereof is preferably so chosen that the emulsion has the highest concentration of fatty material whilst still being readily pourable. Generally the water is present in an amount of 100 to 200% by weight of the fat content.

Suitable fatty materials in the textile lubricant and fat-liquor emulsions are those conventionally used as textile lubricants for filaments and yarns, and for fat-liquoring of leathers at various stages of tanning, respectively. Amongst the suitable fatty materials for leathers are those used in conjunction with leather dyeing.

Preferred compounds of formula I for use in the textile lubricant emulsions and fat-liquor emulsions of the present invention are amphoteric ones, especially the compounds of formula I' in which $R_1'$ is hydrogen, $(C_{1-6})$alkyl or $(C_{2-4})$-hydroxyalkyl and X' is the carboxyl group, in free acid or salt form, and more especially those in which $R_3$ is nonyl, $R_4$ is hydrogen, Alkylene is $-CH_2CH_2-$, $R_1'$ is 2-hydroxyethyl and $-R_2'-X'$ is carboxymethyl in free acid or salt form.

The textile lubricant and fat-liquor emulsions of the present invention are notable for their good storage stability.

The compounds of the present invention are also useful as agents for the degreasing of pelts and leathers and for the desizing of textile materials, e.g. in the form of yarns, woven fabrics, finished articles and carpets. Accordingly, the present invention further provides a method of degreasing pelts and/or leathers and/or for desizing textile materials comprising using, as degreasing and/or desizing agent, a compound of the formula I, as defined above.

This method of degreasing or desizing may be effected in conventional manner. In the degreasing of leather, for example, this may be carried out before, during or after the tanning. Preferably the compounds used are the amphoteric ones of formula I', i.e. the compounds of formula I' in which $R_1'$ is hydrogen, $(C_{1-6})$alkyl or $(C_{2-4})$-hydroxyalkyl.

The compounds of the present invention are also useful an auxiliary agents in tanning for improving the distribution of the tanning agents in the pelts or leathers being tanned. Thus, the present invention further provides a method of tanning pelts or leathers comprising using, as auxiliary agent, a compound of formula I, as defined above. The tanning may be carried out in conventional manner. Preferably, the compounds for such use are the anionic ones of formula I', i.e. the compounds of formula I' in which $R_1'$ is $-R_2'-X'$, as defined above, especially those in which X' is a carboxyl group in free acid or salt form.

The compounds of the present invention can be utilized in other areas where surface active compounds are employed. Thus they may be used as washing agents, washing agent assistants and/or as wetting agents, e.g. in the textile, leather and paper industries.

Because of their particularly good compatibility with the various types of pelts and leathers, and their ease of use in pelt and leather treatments, the compounds of the present invention are preferably employed in the various applications indicated above in the leather industry. It is found that the tanning and handle of the treated pelts and leathers, as well as the dyeing of the treated leathers, are not significantly adversely effected by the use of the compounds of formula I in their treatment, especially by the use of the amphoteric compounds.

In the following examples of the production and use of the compounds of the present invention, percentages are by weight and temperatures in degrees centigrade. In the Application Examples, the percentages by weight are relative to the weights of the treated substrates.

EXAMPLE A

To 1 mol of the compound of formula

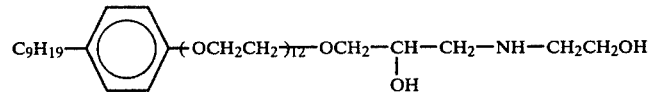

heated to 60° is slowly added dropwise with stirring a 50% aqueous solution of 1 mol of sodium monochloroacetate. The resulting reaction is exothermic. After completion of the reaction the pH of the reaction mixture is adjusted to 7-8 by addition of 30% sodium hydroxide solution. After removal of the aqueous phase containing sodium chloride, the final product is obtained as a clear liquid with a dry substance content of 85-90%.

EXAMPLE B

To 1 mol of the compound of formula

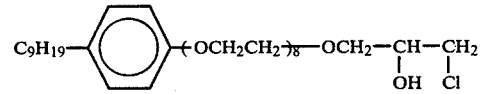

are added dropwise 2 mol of a 30% aqueous sodium hydroxide solution, the temperature being maintained at a maximum of 25° during the addition. The mixture is then stirred for 1 hour and then a 20% aqueous solution of 1 mol of aminoacetic acid is added dropwise. The reaction is slightly exothermic. Thereafter the mixture is heated to 80° and stirred for a further hour at this temperature. The mixture is then transferred to a separating funnel and the aqueous solution containing sodium chloride is removed. Produced is a product consisting of a various brown liquid with a 84% dry substance content.

EXAMPLE C 1 mol of the compound of formula

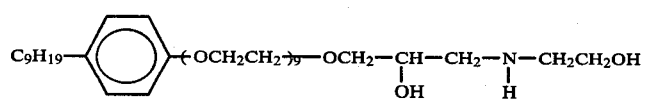

is dissolved in the same weight of acetone and the solution is warmed to 50°. Then the equivalent quantity of propanesultone is added dropwise and the mixture is heated under reflux for 1 hour. The solvent is then removed by distillation yielding the product in free acid form as a highly viscous brown liquid. On addition of 30% aqueous sodium hydroxide solution, the product in sodium salt form is produced.

In a similar manner to that described in the above Examples the following compounds are produced:

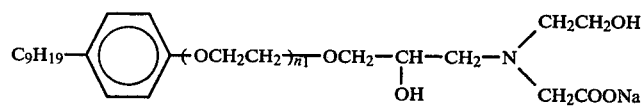

$n_1 = 9, 10, 11, 13, 14.$

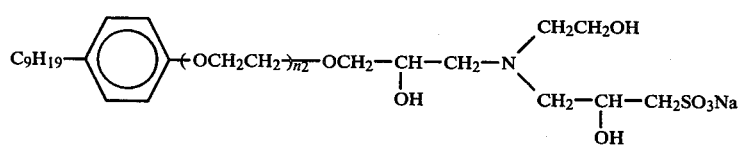

$n_2 = 8, 10, 12, 14.$

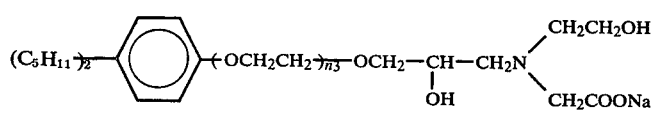

$n_3 = 8, 10, 12, 14.$

In the following Table are presented the above and further compounds produced produced by or analogous to the procedures described in Examples A, B and C. In the last column of the Table the emulsifying power is given. This is the smallest weight proportion emulsifier: Neat's foot oil sufficient to emulsify a mixture of Neat's foot oil, emulsifier and water containing 10% by weight of oil and emulsifier at 20° C.; the weight of oil is expressed to the next lower whole number in each case.

Table (VIII)

| No. | $R_1$ | $R_2$ | $R_3$ | $R_4$ | n | X | Emulsifying power |
|---|---|---|---|---|---|---|---|
| 1 | —CH$_2$—CH$_2$—OH | —CH$_2$ | —C$_9$H$_{19}$ | H | 8 | —COONa | 1:5 |
| 2 | " | " | " | H | 9 | " | 1:5 |
| 3 | " | " | " | H | 10 | " | 1:6 |
| 4 | " | " | " | H | 11 | " | 1:6 |
| 5 | " | " | " | H | 12 | " | 1:7 |
| 6 | " | " | " | H | 13 | " | 1:6 |
| 7 | " | " | " | H | 14 | " | 1:6 |
| 8 | " | " | " | H | 18 | " | 1:5 |
| 9 | " | —CH$_2$—CHOH—CH$_2$ | " | H | 8 | —SO$_3$Na | 1:2 |
| 10 | " | " | " | H | 10 | " | 1:5 |
| 11 | " | " | " | H | 12 | " | 1:5 |
| 12 | " | " | " | H | 14 | " | 1:5 |
| 13 | " | " | " | H | 18 | " | 1:4 |
| 14 | " | —CH$_2$— | C$_5$H$_{11}$ | C$_5$H$_{11}$ | 8 | —COONa | 1:2 |
| 15 | " | " | " | " | 10 | " | 1:3 |
| 16 | " | " | " | " | 12 | " | 1:4 |
| 17 | " | " | " | " | 14 | " | 1:2 |
| 18 | —C$_4$H$_9$(n) | " | —C$_9$H$_{19}$ | —C$_9$H$_{19}$ | 18 | —COONa | 1:3 |
| 19 | —H | " | " | H | 8 | " | 1:3 |
| 20 | —CH$_2$—CH$_2$—OH | —CH$_2$—CH$_2$—CH$_2$— | " | H | 9 | —SO$_3$Na | 1:4 |
| 21 | —CH$_2$—COONa | —CH$_2$— | " | H | 10 | —COONa | — |
| 22 | —CH$_2$—CH$_2$—SO$_3$Na | —CH$_2$—CH$_2$—CH$_2$—CH$_2$— | —C$_4$H$_9$ | —C$_4$H$_9$ | 14 | " | 1:4 |
| 23 | " | —CH$_2$—CHOH—CH$_2$— | —C$_9$H$_{19}$ | —C$_9$H$_{19}$ | 18 | —SO$_3$Na | 1:3 |

The reaction products of the mono- and dialkyl- phenols indicated in the above Examples consist of technical mixtures since the starting mono- and dialkylphenols are themselves technical mixtures. The nonyl groups ($R_3$) in the compounds Nos. 1,18 and 23 of the Table are mainly para to the oxygen atom in the molecules. The alkyl groups in the dialkylphenols are mainly ortho and para to the oxygen atom. The alkyl groups for $R_3$ and $R_4$ are branched chain.

In an analogous manner to that for producing the sodium salts amongst the above compounds, the corresponding potassium salts can be produced equally readily. In an analogous manner to that described in Example A or C, the corresponding ammonium salts of the above compounds can be produced.

PREPARATIONS

Preparation 1:
  6.25—% Compound No. 5
  43.75—% Neat's foot oil
  50—% Water
Preparation 2:
  7.15—% Compound No. 5
  42.85—% Sperm oil
  50—% Water
Preparation 3:
  8.4—% Compound No. 5
  41.6—% Beef tallow
  50—% Water
Preparation 4:
  30—% Methyl ester of a $C_{15-19}$ fatty acid mixture
  5—% Paraffin oil
  4—% Stearic acid
  11—% Compound No. 5
  50—% Water
Preparation 5:
  30—% Neat's foot oil
  10—% Olein
  8—% Compound No. 8
  0.5—% 25% aqueous ammonia solution
  51.5—% Water

Preparation 6 (Textile Lubricant Emulsion)

A mixture of 53% sperm oil/peanut oil/olive oil mixture, 9.5% olein and 12.5% compound No. 5 is well stirred, and then 25% water is stirred into the mixture. The resulting, readily thinnable paste can be used as a textile lubricant emulsion for e.g. worsted yarn. In practice, the paste is diluted sufficiently for spraying onto the textile fibres.

Application Examples

1. Emulsifier in Fat-Liquor Emulsion

Wet blue chrome calf sides, vegetable- or chrome-retanned by a conventional method, are wetted back and then treated with 0.8% by weight of sodium bicarbonate in an aqueous solution at pH 5. The solution is then drawn off and replaced by 200% by weight of water at 60°, to which is subsequently added 0.4% by weight of C.I. Acid Brown 311. Dyeing is effected for 15 minutes.

2.1% by weight of the fat liquor preparation 4 described above is added to the dyebath containing the pelts and the pelts are agitated in the solution for 45 minutes. Then 0.2% by weight of formic acid is added and the pelts milled for a further 15 minutes, after which the bath is drawn off. Finally the pelts are rinsed with 500% by weight of water for 10 minutes, freed of some of the water by allowing it to drip off, and dried.

The same procedure can be effected using the fat liquor preparation 1, 2, 3 or 5, as described above, instead of fat liquor preparation 4.

2. Pre-Tanning Degreasing Agent

Pickled sheep skins are wetted back with 90% by weight of water at 25° for 2 hours, and then 6% by weight of sodium chloride and 4–6% by weight of compound No. 3 are added to the water. The sheep skins are allowed to soak in the solution for one hour, after which they are bated and the bath neutralised.

The same procedure can be effected using the compound No. 1 instead of compound No. 3 as the degreasing agent.

3. Chrome-Tanning of Calf Leather

Pickled calf pelts are wetted back in an aqueous solution consisting of 0.8–1% by weight of compound No. 21 and 60% by weight of water at a temperature of 20°. Then 1% by weight of sodium chloride and, over a period of 6 hours, 45% by weight of 35% chromium potassium sulphate solution, are added, and the wetting back is continued for a further 2 hours.

0.6% by weight of sodium carbonate is then added to the tanning bath and the calf pelts treated therein for a further 5 hours.

The bath is then drawn off and the pelts are stored for 2 days and finally pared.

Treatment in the presence of the emulsifier, compound No. 21, causes an improved distribution of the chrome tanning agent in the cross section of the leather.

What is claimed is:

1. A compound or mixture of compounds of the formula, $$R-CH_2-CH(OH)-CH_2-N\begin{matrix}R_1\\R_2-X\end{matrix}$$

in which
R is a mono- or dialkylphenolpoly($C_{2-3}$)-alkyleneglycolether group bound through an oxygen atom;
$R_1$ is hydrogen; unsubstituted alkyl; alkyl monosubstituted by hydroxy; alkyl monosubstituted by sulfo; alkyl monosubstituted by carboxy; alkyl monosubstituted by hydroxy and monosubstituted by sulfo; or alkyl monosubstituted by hydroxy and monosubstituted by carboxy;
$R_2$ is unsubstituted alkylene or alkylene monosubstituted by hydroxy; and
X is sulfo or carboxy,
with the provisos that R contains at least 8 ($C_{2-3}$) alkyleneoxy units and that an average of at least 50% of the alkyleneoxy units in R are ethyleneoxy, each sulfo and carboxy group of said compound or mixture of compounds being in free acid or salt form.

2. A compound or mixture of compounds according to claim 1, in which the alkyleneoxy units in R are each independently ethyleneoxy or propyleneoxy.

3. A compound or mixture of compounds according to claim 1, in which there are 8 to 30 alkyleneoxy units in R.

4. A compound or mixture of compounds according to claim 1, in which R is a group of formula,

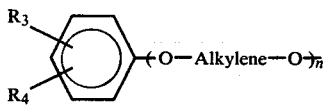

in which
R₃ is (C₄₋₉)alkyl,
R₄ is hydrogen or (C₄₋₉)alkyl,
each Alkylene, independently, is —CH₂CH₂— or —CH₂CH(CH₃)— and
n is an integer 8 to 18,
with the proviso that an average of at least 50% of the alkyleneoxy units, Alkylene-O, are ethyleneoxy.

5. A compound or mixture of compounds according to claim 1 in which R₂ is (C₁₋₄)alkylene or 2-hydroxy-1,3-trimethylene.

6. The compound according to claim 1, of formula,

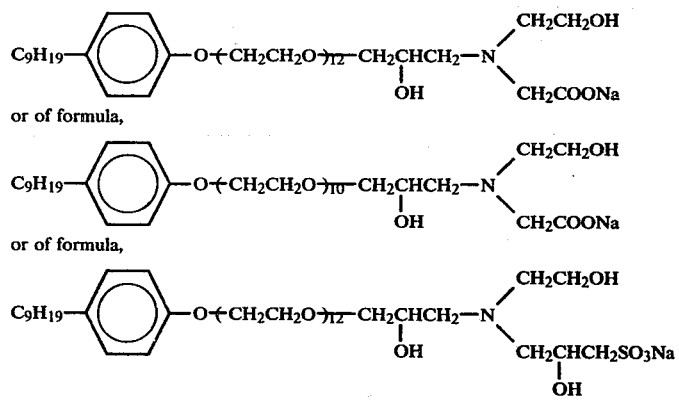

or of formula,

7. A compound or mixture of compounds according to claim 1 in which the alkyl substituent of the monoalkylphenoxy group in R or each alkyl substituent of the dialkylphenoxy group in R contains 4 to 9 carbon atoms.

8. A compound or mixture of compounds according to claim 1 in which R₁ is hydrogen, (C₁₋₆)alkyl, (C₂₋₄)hydroxyalkyl, (C₁₋₄)alkyl monosubstituted by carboxy, (C₁₋₄)alkyl monosubstituted by sulfo, 2-hydroxy-n-propyl monosubstituted by carboxy or 2-hydroxy-n-propyl monosubstituted by sulfo, each sulfo and carboxy group of said compound or mixture of compounds being in free acid or salt form.

9. A compound or mixture of compounds according to claim 5 in which R₂ is 2-hydroxy-1,3-trimethylene and X attached thereto is a sulfo group or R₂ is methylene and X attached thereto is a carboxy group, each sulfo and carboxy group of said compound of mixture of compounds being in free acid or salt form.

10. A compound or mixture of compounds according to claim 9 in which R₂ is methylene and X attached thereto is a carboxy group, each sulfo and carboxy group of said compound or mixture of compounds being in free acid or salt form.

11. A compound or mixture of compounds according to claim 1 in which the group

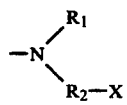

is one of formula,

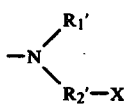

in which
R₁' is hydrogen; (C₁₋₆)alkyl; (C₂₋₄)hydroxyalkyl or a group of formula —R₂'—X';

R₂' is (C₁₋₄)alkylene or 2-hydroxy-1,3-trimethylene;

and
X' is sulfo or carboxy,
each sulfo and carboxy group of said compound or mixture of compounds being in free acid or salt form.

12. A compound or mixture of compounds according to claim 1 of the formula,

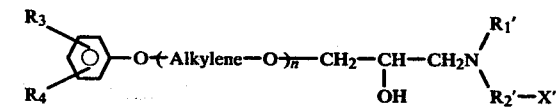

in which
R₃ is (C₄₋₉)alkyl;
R₄ is hydrogen or (C₄₋₉)alkyl;
each Alkylene, independently, is —CH₂CH₂— or —CH₂CH(CH₃)—;
n is an integer 8 to 18;
R₁' is hydrogen; (C₁₋₆)alkyl; (C₂₋₄)hydroxyalkyl or a group of formula —R₂'—X';
R₂' is (C₁₋₄)alkylene or 2-hydroxy-1,3-trimethylene; and
X' is sulfo or carboxy, with the proviso that an average of at least 50% of the Alkylene-O, units are ethyleneoxy, each sulfo and carboxy group of said compound or mixture of compounds being in free acid or salt form.

13. A compound or mixture of compounds according to claim 1 in which the alkyl substituent of the monoalkylphenoxy group in R or each alkyl substituent of the dialkylphenoxy group in R contains 4 to 9 carbon atoms; $R_1$ is hydrogen, $(C_{1-6})$alkyl, $(C_{2-4})$hydroxyalkyl, $(C_{1-4})$alkyl monosubstituted by carboxy, $(C_{1-4})$alkyl monosubstituted by sulfo, 2-hydroxy-n-propyl monosubstituted by carboxy or 2-hydroxy-n-propyl monosubstituted by sulfo; and $R_2$ is $(C_{1-4})$alkylene or 2-hydroxy-1,3-trimethylene, with the proviso that R contains from 8 to 30 alkyleneoxy units, each sulfo and carboxy group of said compound or mixture of compounds being in free acid or salt form.

* * * * *

UNITED STATES PATENT AND TRADEMARK OFFICE
CERTIFICATE OF CORRECTION

PATENT NO. : 4,208,345
DATED : June 17, 1980
INVENTOR(S) : Werner Amati

It is certified that error appears in the above—identified patent and that said Letters Patent is hereby corrected as shown below:

Col. 3, line 57; delete "x" and insert in its place --X--.

Col. 3, line 65; delete "ably" and insert in its place --able--.

Col. 8, line 9; delete "produced" (second occurrence).

Claim 11, Col. 12; delete the formula

" $-N\begin{matrix} R_1' \\ R_2'-X \end{matrix}$ " and insert in its place the formula -- $-N\begin{matrix} R_1' \\ R_2'-X' \end{matrix}$ --.

Signed and Sealed this

Eighteenth Day of May 1982

[SEAL]

Attest:

GERALD J. MOSSINGHOFF

Attesting Officer

Commissioner of Patents and Trademarks